(12) United States Patent
Masalkar et al.

(10) Patent No.: US 8,724,887 B2
(45) Date of Patent: May 13, 2014

(54) ENVIRONMENTAL MODIFICATIONS TO MITIGATE ENVIRONMENTAL FACTORS

(75) Inventors: Prafulla Masalkar, Issaquah, WA (US); Alan Leach, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 13/020,705

(22) Filed: Feb. 3, 2011

(65) Prior Publication Data

US 2012/0201424 A1 Aug. 9, 2012

(51) Int. Cl.
*G06K 9/00* (2006.01)
*G06K 9/36* (2006.01)
*G03B 15/00* (2006.01)

(52) U.S. Cl.
USPC ............ 382/154; 382/274; 396/65; 396/69; 396/98; 396/154

(58) Field of Classification Search
USPC ................. 382/154, 274; 396/65, 69, 98, 154
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Malik, et al. "Consideration of Illumination Effects and Optimization of Window Size for Accurate Calculation of Depth Map for 3D Shape Recovery." Pattern Recognition. 40. (2007): 154-170. Print.*

(Continued)

*Primary Examiner* — Michael A Newman
(74) *Attorney, Agent, or Firm* — Judy Yee; Micky Minhas

(57) ABSTRACT

A method of depth imaging includes acquiring a depth image from a depth camera, identifying an environmental factor invalidating depth information in one or more portions of the depth image, and outputting an environmental modification to mitigate the environmental factor.

20 Claims, 5 Drawing Sheets

(56) References Cited

U.S. PATENT DOCUMENTS

| | | |
|---|---|---|
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,249,285 B1 | 6/2001 | Madden et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,301,440 B1 | 10/2001 | Bolle et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,061,485 B2 | 6/2006 | Tanguay, Jr. et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 * | 8/2007 | Bell ............................ 345/156 |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,430,365 B2 * | 9/2008 | Ng et al. ...................... 396/51 |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B2 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 * | 12/2011 | Marks .......................... 345/632 |

(56) References Cited

U.S. PATENT DOCUMENTS

| | | | |
|---|---|---|---|
| 2006/0204050 A1* | 9/2006 | Takizawa | 382/115 |
| 2008/0026838 A1 | 1/2008 | Dunstan et al. | |
| 2009/0102841 A1 | 4/2009 | Clavadetscher | |
| 2009/0163262 A1 | 6/2009 | Kang | |
| 2009/0185358 A1 | 7/2009 | Liu et al. | |
| 2010/0149310 A1 | 6/2010 | Zhang et al. | |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO 2005034035 A1 * | 4/2005 |

OTHER PUBLICATIONS

Kang, et al. "A Multibaseline Stereo System with Active Illumination and Real-time Image Acquisition." ICCV '95 Proceedings of the Fifth International Conference on Computer Vision . (1995): 88-93. Print.*

Cheng-Tse. Robust Upper Body Pose Recognition in Unconstrained Environments using Haar-Disparity. MA thesis. University of Canterbury, 2008. Print.*

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Creech, Howard, "Pentax K10D Digital Camera Full Review", Retrieved at << http://www.digitalcamerareview.com/default.asp?newsID=3050&review=pentax+k10d >>, Mar. 25, 2007, pp. 9.

* cited by examiner

TEST IMAGE          CONTROL IMAGE

ENVIRONMENTAL MODIFICATIONS TO MITIGATE ENVIRONMENTAL FACTORS

BACKGROUND

Video game systems may utilize depth cameras to capture images of game players and convert the information to depth maps which are used to model virtual skeletons of the game players. Frequently, depth cameras use projected infrared light to determine depth of objects in an imaged scene. Accurate determination of the depth of objects in the scene can be hindered when environmental factors disrupt the camera's ability to receive the projected infrared light.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Accordingly, a system is disclosed for acquiring a depth image from a depth camera, identifying one or more environmental factors invalidating depth information in one or more areas of the depth image, and outputting an environmental modification to mitigate the environmental factor.

DETAILED DESCRIPTION

A depth-image analysis system, such as a 3D-vision gaming system, may include a depth camera capable of observing one or more players. As the depth camera captures images of a player within an observed scene (i.e., the imaged scene in the field of view of the depth camera), those images may be interpreted and modeled with one or more virtual skeletons. As described in more detail below, factors in the environment may cause problems with the depth images captured by the depth camera leading to areas of invalid depth information in the depth images. For example, high levels of ambient light in the scene can interfere with the imaging of the player. Additionally, if the player being imaged is wearing low-reflectivity clothing, the depth camera may be less able to accurately image the entire player. These environmental factors can disrupt imaging and subsequent modeling of the player.

Figure 1:
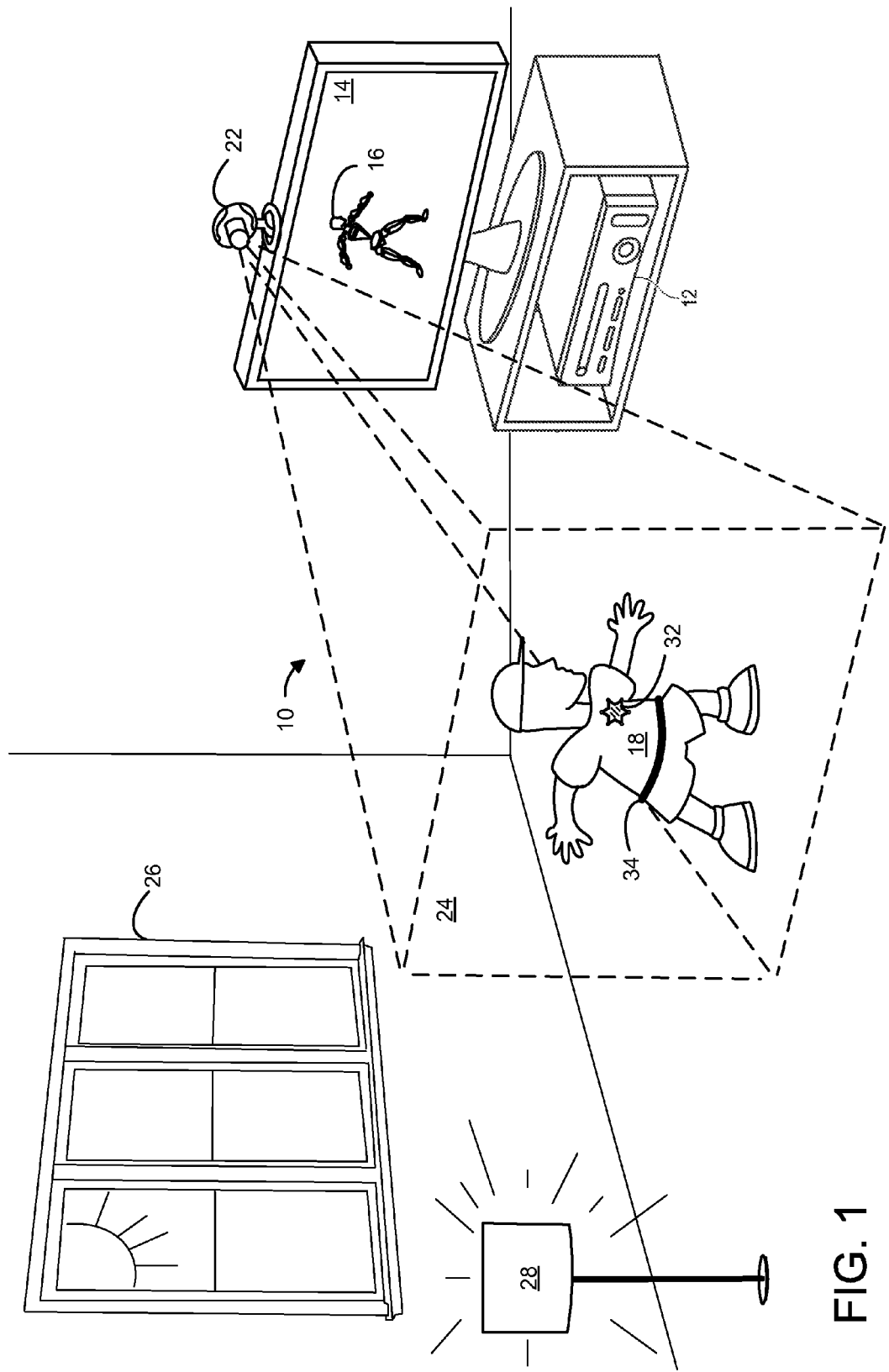
FIG. 1 shows a depth-image analysis system viewing an observed scene in accordance with an embodiment of the present disclosure.

FIG. 1 shows a nonlimiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 14 such as a television or a computer monitor, which may be used to present game visuals to game players. As one example, display device 14 may be used to visually present a virtual avatar 16 that human target 18 controls with his movements. The depth-image analysis system 10 may include a capture device, such as a depth camera 22, that visually monitors or tracks human target 18 within an observed scene 24. Depth camera 22 is discussed in greater detail with respect to FIGS. 2 and 6.

Human target 18 is shown here as a game player within observed scene 24. Human target 18 is tracked by depth camera 22 so that the movements of human target 18 may be interpreted by gaming system 12 as controls that can be used to affect the game being executed by gaming system 12. In other words, human target 18 may use his or her movements to control the game. The movements of human target 18 may be interpreted as virtually any type of game control. Some movements of human target 18 may be interpreted as controls that serve purposes other than controlling virtual avatar 16. As nonlimiting examples, movements of human target 18 may be interpreted as controls that steer a virtual racing car, shoot a virtual weapon, navigate a first-person perspective through a virtual world, or manipulate various aspects of a simulated world. Movements may also be interpreted as auxiliary game management controls. For example, human target 18 may use movements to end, pause, save, select a level, view high scores, communicate with other players, etc.

Depth camera 22 may also be used to interpret target movements as operating system and/or application controls that are outside the realm of gaming. Virtually any controllable aspect of an operating system and/or application may be controlled by movements of a human target 18. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a nonlimiting example in the form of gaming system 12, display device 14, and depth camera 22. In general, a depth-image analysis system may include a computing system 90, shown in simplified form in FIG. 6, which will be discussed in greater detail below.

Figure 2:
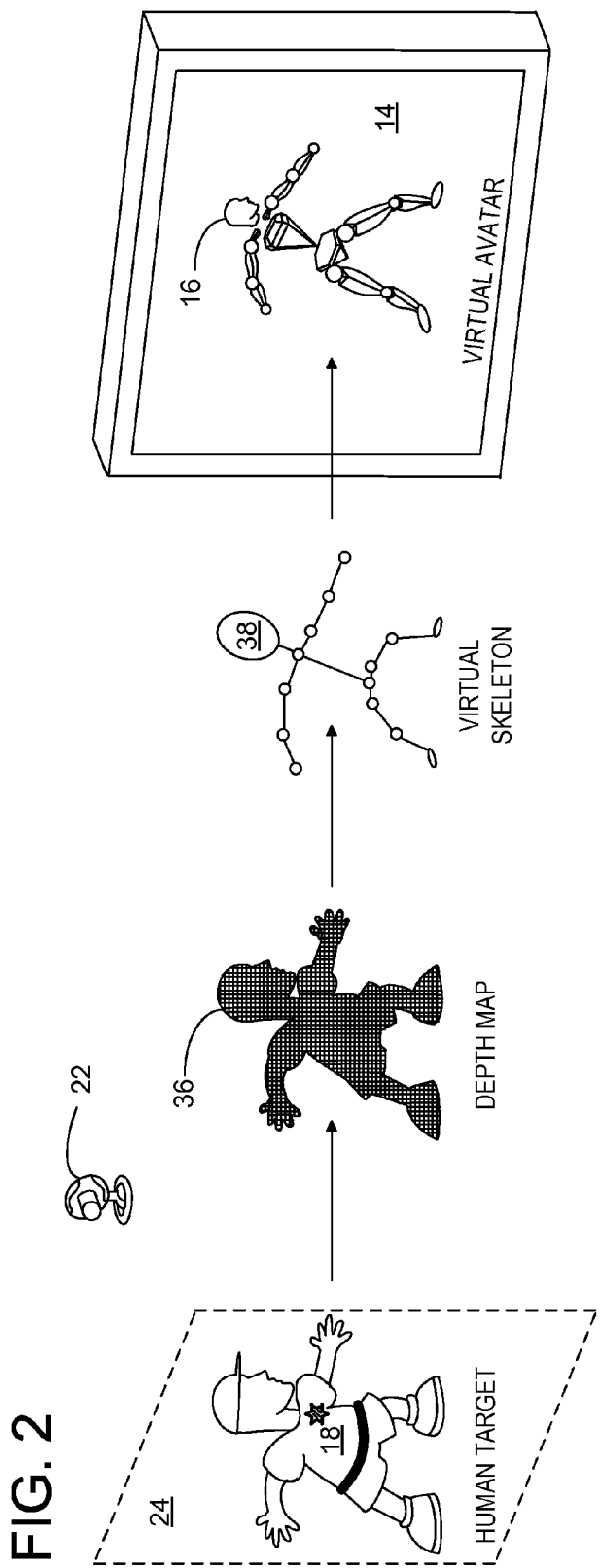
FIG. 2 somewhat schematically shows the modeling of a human target with a virtual skeleton.

FIG. 2 shows a simplified processing pipeline in which human target 18 in an observed scene 24 is modeled as a virtual skeleton 38 that can be used to draw a virtual avatar 16 on display device 14 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, human target 18 and the rest of observed scene 24 may be imaged by a capture device such as depth camera 22. The depth camera may determine, for each pixel, the depth of a surface in the observed scene relative to the depth camera. Virtually any depth finding technology may be used without departing from the scope of this disclosure. Example depth finding technologies are discussed in more detail with reference to capture device 98 of FIG. 6.

The depth information determined for each pixel may be used to generate a depth map 36. Such a depth map may take the form of virtually any suitable data structure, including but not limited to a matrix that includes a depth value for each pixel of the observed scene. In FIG. 2, depth map 36 is schematically illustrated as a pixelated grid of the silhouette of human target 18. This illustration is for simplicity of understanding, not technical accuracy. It is to be understood that a depth map generally includes depth information for all pixels, not just pixels that image the human target 18, and that the perspective of depth camera 22 would not result in the silhouette depicted in FIG. 2.

Virtual skeleton 38 may be derived from depth map 36 to provide a machine readable representation of human target 18. In other words, virtual skeleton 38 is derived from depth map 36 to model human target 18. The virtual skeleton 38 may be derived from the depth map in any suitable manner. In some embodiments, one or more skeletal fitting algorithms may be applied to the depth map. The present disclosure is compatible with virtually any skeletal modeling techniques.

The virtual skeleton 38 may include a plurality of joints, each joint corresponding to a portion of the human target. In FIG. 2, virtual skeleton 38 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 2, a virtual avatar 16 may be rendered on display device 14 as a visual representation of virtual skeleton 38. Because virtual skeleton 38 models human target 18, and the rendering of the virtual avatar 16 is based on the virtual skeleton 38, the virtual avatar 16 serves as a viewable digital representation of the human target 18. As such, movement of virtual avatar 16 on display device 14 reflects the movements of human target 18.

In some embodiments, only portions of a virtual avatar will be presented on display device 14. As one nonlimiting example, display device 14 may present a first person perspective to human target 18 and may therefore present the portions of the virtual avatar that could be viewed through the virtual eyes of the virtual avatar (e.g., outstretched hands holding a steering wheel, outstretched arms holding a rifle, outstretched hands grabbing a virtual object in a three-dimensional virtual world, etc.).

While virtual avatar 16 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

Returning to FIG. 1, an example embodiment is shown depicting one or more environmental factors that can result in invalid depth information in the depth image. Window 26 is allowing sunlight to enter the observed scene 24. In addition, lamp 28 is on. Excess light in the imaged scene can overwhelm the projected infrared light that the depth camera uses to determine depth of surfaces in the scene, leading to areas of invalid depth information in the depth image. These areas can result in inaccurate modeling of the virtual skeleton and unpredictable computer control. High and low reflectivity of the human target can also cause areas of invalid depth information. In this example, human target 18 is wearing a highly reflective sheriff's badge 32 and a low reflective material belt 34.

Figure 3:
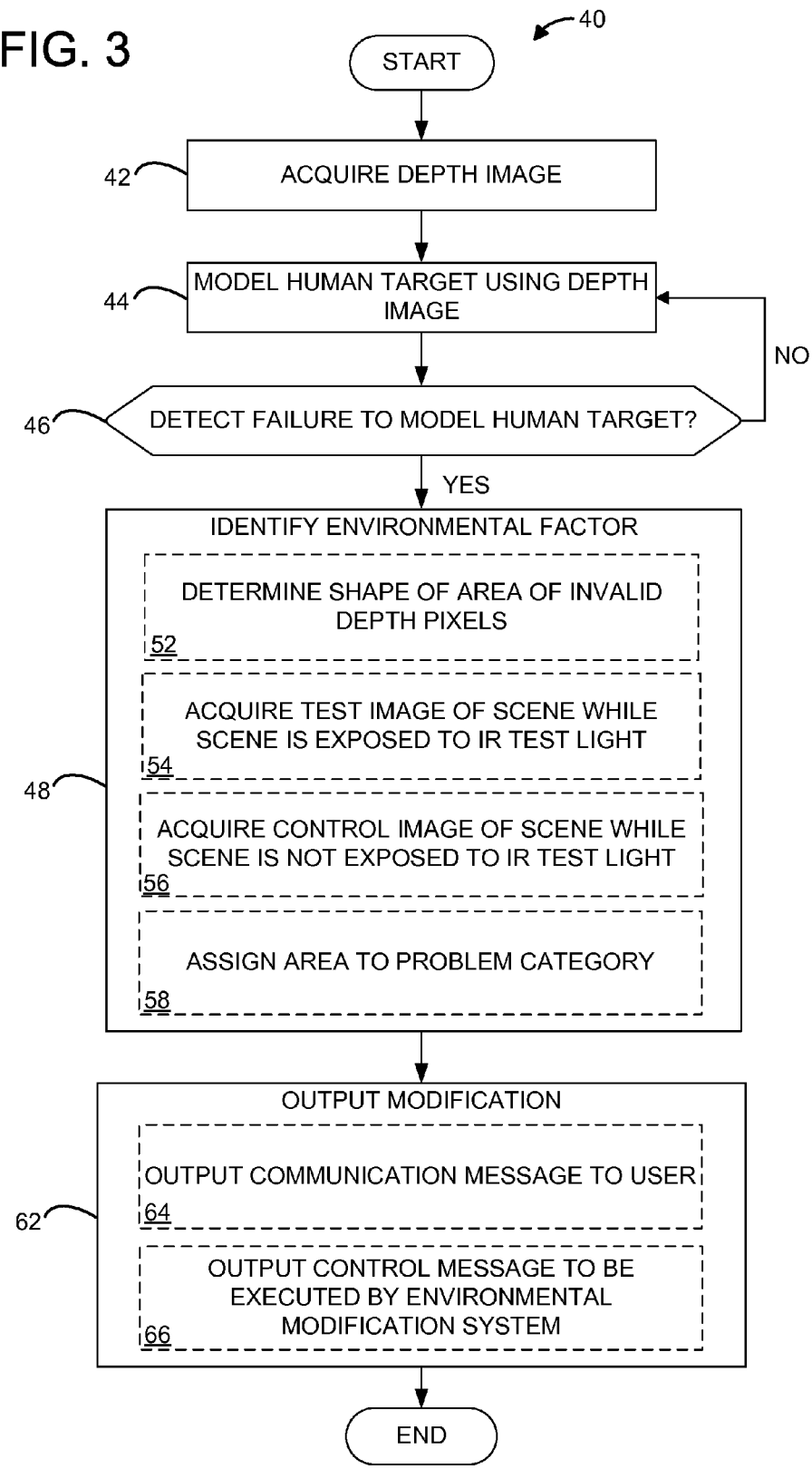
FIG. 3 is a flow chart describing a method for identifying an environmental factor invalidating depth information and outputting an environmental modification to mitigate the factor.

FIG. 3 illustrates a method 40 for identifying an environmental factor that causes invalid depth information and outputting a modification to mitigate the environmental factor. At 42, method 40 includes acquiring a depth image from a depth camera. In some embodiments, the depth camera is configured to measure a distance between the depth camera and surfaces in the scene and output the depth image as an indication of such measured distances. In some embodiments, the depth camera is configured to obtain information that is used by an off-board computing system to measure a distance between the depth camera and surfaces in the scene. The present disclosure is compatible with both arrangements—i.e., acquiring a depth image from the depth camera may be done directly or via an intermediate depth processor, such as a computing system 90.

Next, at 44 a human target imaged by the depth image is modeled with a virtual skeleton, as described above with reference to FIG. 2.

At 46, it is determined if a failure to model the human target has been detected. A failure to model a human target may result from one or more skeletal joints that cannot be positioned, one or more skeletal joint positions that are reported with a low confidence, etc.

If a failure to model the human target with the virtual skeleton is not detected at 46, method 40 returns to 44, where the human target continues to be modeled with a virtual skeleton. If a failure to model the human target with the virtual skeleton is detected at 46, an environmental factor invalidating depth information in one or more areas of the depth image is identified at 48. Such an environmental factor may be identified in any suitable manner. As described by way of example below, in some embodiments characteristics of a depth image and/or other information collected by a depth camera can be analyzed to identify previously recognized characteristics that are known to result from specific environmental factors (e.g., too much sunlight or other infrared light, low reflectivity clothing, high reflectivity clothing, and/or subject placement within the physical environment).

As indicated at 52, one nonlimiting option for identifying the environmental factor includes identifying a responsible cluster of invalid depth pixels and determining the shape of the cluster. If the cluster contains greater than a threshold amount of invalid depth pixels, it will be identified as an area of invalid depth information. This threshold can be set to any static and/or dynamic amount. For example, a static threshold of 36 adjacent pixels may be considered an area of invalid depth information in some embodiments.

At 54 the camera acquires a test image of the imaged scene while the scene is exposed with infrared test light (i.e., during a test mode). In some embodiments, the infrared test light may wash the entire scene. In some embodiments, the infrared test light may be aimed at a particular pixel area that is under consideration. The infrared test light may be generated from the same source that is used by the depth camera to measure depth information, or from an auxiliary test source.

At 56, the camera acquires a control image of the imaged scene while the scene is not exposed with the infrared test light (i.e., during a control mode). The control image may be acquired immediately before and/or after the test image. In this way, differences between the images, other than the presence of the test light, may be reduced or eliminated. The test image and control image are described in greater detail with reference to FIG. 4. Differences between the test image and the control image can be analyzed and used to identify an environmental factor that is hindering skeletal modeling.

At 58, the one or more areas of the depth image including invalid depth information are assigned to a problem category from a plurality of predetermined problem categories. Such assignment may be based on a variety of different information, including, but not limited to, the cluster of invalid depth pixels, the test image, and the control image.

Once the environmental factor has been identified, an environmental modification is output at 62 to mitigate the environmental factor. The environmental modification is selected based on the problem category determined in step 58 above and described in greater detail with reference to FIG. 5.

As indicated at 64, the modification can be output as a communication message for presentation to a human user. Such a communication message may be used to provide information that the human user can use to mitigate the environmental factor. For example, the communication message may instruct the human user to close the blinds, turn off a light, move closer to the camera, change clothing, etc. The communication message may take the form of an audio message that is to be played via one or more speakers, a visual message that is to be displayed on a display device, or virtually any other form. The communication message may be formatted in any suitable manner for playback/presentation via any suitable device. In some embodiments, the communication message may be implemented as a digital message that is sent from the computing system to a suitable presentation device (e.g., display device, speakers, etc.).

Additionally or alternatively, the environment modification can be output at 66 as a control message for execution by an environmental modification system so that the environmental modification system automatically alters the environment to mitigate the environmental factor without human intervention. In such cases, the control message may be formatted for compatibility with the environmental modification system. As nonlimiting examples, the control message may be configured to cause the environmental modification system to automatically close the blinds, automatically turn off a light, etc.).

Figure 4:
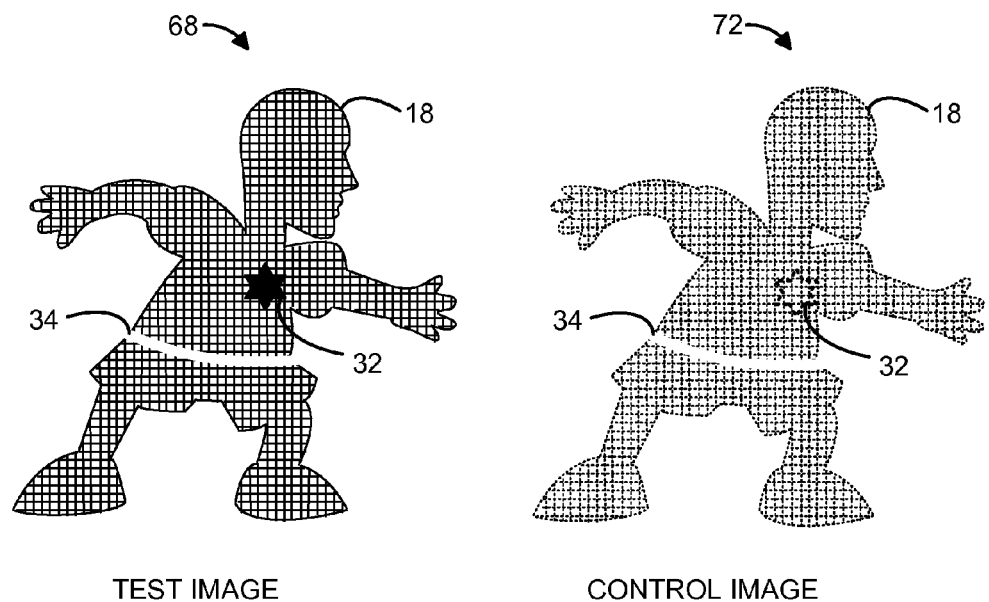
FIG. 4 schematically shows a test image and a control image of a human target captured by a depth camera.

FIG. 4 schematically shows an example test image 68 and an example control image 72 of human target 18 acquired from the depth camera. This illustration is for simplicity of understanding, not technical accuracy. It is to be understood that test and control images may include information for all pixels, not just pixels that image the human target 18. Furthermore, the information that is recorded by the depth camera during the test image period and the control image period is schematically represented as different grid fills. In practice, the test image and the control image may be gray scale images, color images, or other suitable images, which may be represented as a suitable data structure, such as a matrix with intensity values corresponding to each pixel. The test images may be acquired using the same part of the depth camera that is used to measure depth information, and/or the test images may be acquired using another part of the depth camera or an auxiliary camera.

As schematically shown on the left, a test image 68 can be taken while human target 18 is exposed with infrared test light. As one example, each pixel of the test image 68 may be an unprocessed gray level intensity. In FIG. 4, the unprocessed gray level intensities are depicted as a pixelated grid corresponding to the human target 18. In this example, the sheriff's badge 32 is made of highly reflective material and results in saturated pixels in the test image. Conversely, the belt 34 is made of low reflectivity material and results in pixels that have little or no gray level intensity.

As schematically shown on the right, a control image 72 can be taken while human target 18 is not exposed with infrared test light. As discussed above, the control image may be compared to the test image to assess environmental factors that may be affecting depth image analysis.

Figure 5:
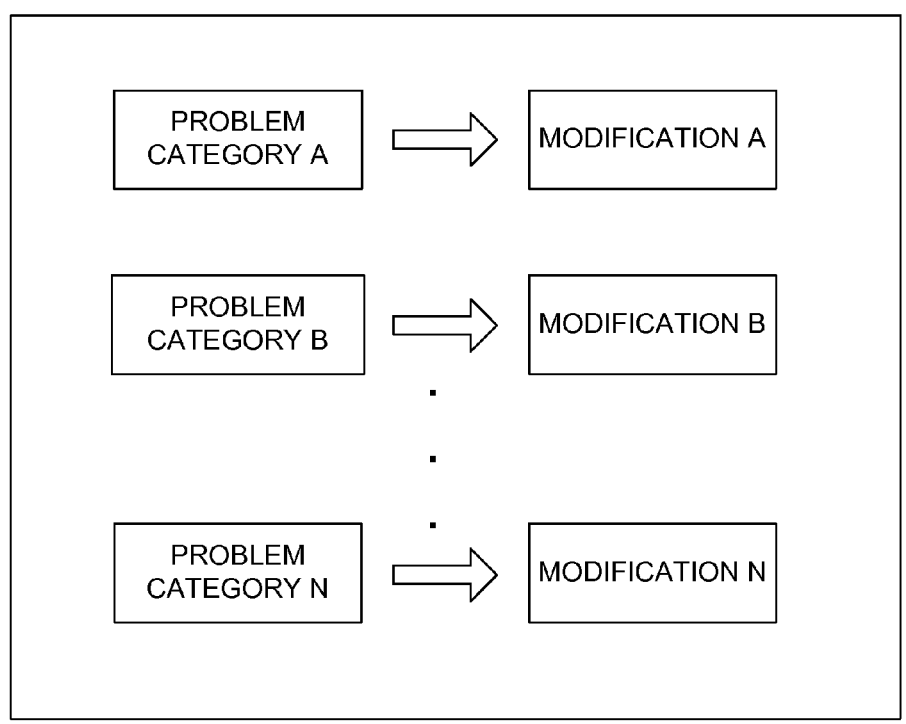
FIG. 5 is an example of predetermined problem categories and modifications based on the problem categories.

As introduced above, each area of invalid depth pixels can be assigned to a problem category. The areas are assigned to the categories based on one or more of the size, shape, and/or position of the area of invalid depth pixels and differences between the test image and control image, for example. FIG. 5 schematically shows a plurality of predefined problem categories (e.g., problem category A, problem category B, problem category N).

As shown in FIG. 5, each problem category has a corresponding environmental modification (e.g., modification A, modification B, and modification N). The environmental modification may comprise a communication message to mitigate the environmental factor causing the area of invalid pixels. Additionally or alternatively, the environmental modification may comprise a control message that modifies the environment without human intervention.

Non-limiting examples of problem categories and corresponding modifications are provided below.

A first example of a problem category is low reflectivity materials on the human target. Low reflectivity materials on the human target may make it difficult to model the human target with a virtual skeleton, particularly when the human target is relatively far away from the depth camera. Low reflectivity materials may be identified based on the size, shape, and/or position of an area of invalid pixels and/or the relative infrared light saturation of the test image compared to the control image. For example, the area containing invalid depth pixels may be assigned to a low reflectivity problem category if the area is a shape of a clothing item of the human target and the area of the test image corresponding to the invalid pixels does not change by a threshold amount compared to the same area of the control image.

The low reflectivity problem category may be associated with an environmental modification designed to mitigate the effect the low reflectivity materials have on the ability of the computing system to model the human target with a virtual skeleton. As one example, the solution may include moving the human target physically closer to the depth camera. As such, the environmental modification associated with the low reflectivity problem category may be a communication message instructing the human target to move towards the depth camera. In some scenarios, the modification may additionally or alternatively include a communication message instructing the human target to remove the clothing item identified as having low reflectivity.

A second example of a problem category is highly reflective materials on the human target. Highly reflective materials on the human target may make it difficult to model the human target with a virtual skeleton, particularly when the human target is close to the depth camera and/or a high amount of ambient light is present in the imaged scene. Highly reflective materials on the human target can be identified based on a size, shape, and/or position of an area of invalid pixels and/or the relative infrared light saturation of the test image compared to the control image. The area containing invalid depth pixels may be assigned to the highly reflective materials on the human target problem category if the area has a round shape, is surrounded by near-depth pixels, and/or the area of the test image corresponding to the area of invalid depth pixels has high intensity pixels in a round shape that are reduced by a threshold amount in the same area of the control image.

The highly reflective materials problem category may be associated with an environmental modification designed to mitigate the effect the high reflectivity materials have on the ability of the computing system to model the human target with a virtual skeleton. One example of an environmental modification to mitigate the highly reflective materials may be a communication message instructing the human target to move away from the depth camera. Additionally or alternatively, a user may be instructed to reduce ambient light present in the imaged scene.

A third example of a problem category is overall high ambient light. Overall high ambient light may make it difficult for the depth camera to differentiate between projected infrared light intended to capture depth information and ambient light present in the imaged scene. In other words, ambient light may saturate a scene, thus rendering the projected light less effective. This may result in difficulties modeling the human target. Examples of high ambient light sources include windows, skylights, lamps, etc. Overall high ambient light may be identified by a high overall noise level in the depth image, where the depth information of surfaces in the imaged scene is not easily differentiated from the background. The pixel saturation of the control image of the imaged scene may not reduce by a threshold amount compared to the test image of the imaged scene as the signal from the projected infrared light may not be strong enough to be detected compared to the signal from the ambient light.

An environmental modification associated with overall high ambient light may be a communication message identifying the light source causing the ambient light and/or instructing the user to reduce the ambient light by shading windows, dimming lights, etc. Identification of the light source may be based on a relative location of the area of highest saturated pixels in the control and/or test images. Additionally or alternatively, an environmental modification may be a control message that causes an environmental modification system to automatically adjust the ambient light (e.g., by closing blinds and/or dimming lamps).

A fourth example of a problem category is low angle sunlight. The low angle sunlight problem category may result from low angle sunlight entering the imaged scene and creating a localized stripe of light across a human target. The stripe of light can cause an area of invalid depth pixels disrupting modeling of the human target with a virtual skeleton. The area containing invalid depth pixels may be assigned to the low angle sunlight problem category if the area is a specific and localized stripe of invalid depth pixels and if the area of the test image corresponding to the area of invalid depth pixels has high intensity pixels in a shape of a stripe that are not reduced by a threshold amount in the same area of the control image. An example of an environmental modification associated with the low angle sunlight problem category may be a recommendation to a user to block the low angle sunlight, for example by closing blinds.

A fifth example of a problem category is a spot light source. Example spot light sources include halogen and incandescent lamps. Spot light sources can cause areas of invalid depth pixels corresponding to areas where the light source shines on the human target. The area containing invalid depth pixels may be assigned to the spot light source problem category if the area has a round shape and the test image of the area has high intensity pixels in a round shape that are not reduced by a threshold amount in the same area of the control image. An environmental modification may include a communication message instructing a user to turn off an identified light source.

A sixth example of a problem category is low signal-to-ambient light. Low signal-to-ambient light can occur when ambient light in the imaged scene is high and/or the human target is relatively far from the depth camera. Low signal-to-ambient light may be identified by the depth image having multiple small groups of invalid depth pixels and the image pixel intensity in the control image being reduced by a threshold amount compared to the test image. An example of an environmental modification associated with the problem category is a communication message comprising a recommendation to the human target to move closer to the depth camera and/or reduce ambient light present in the imaged scene.

In addition to the above listed examples, there are scenarios where a depth image may contain one or more areas of invalid depth pixels that do not disrupt imaging of the human target. One example of such a problem category is a no reflective surface in the background, such as a wall that is out of the range of the depth camera. In this example, the area of invalid depth pixels is a large cluster in the background of the imaged scene, and low intensity pixels in the test image do not change by a threshold amount in the control image. Another example of a problem category that does not disrupt modeling of a human target is specular reflective surfaces in the images scene, such as mirrors or glass windows. Specular reflective surfaces may cause areas of geometrically-shaped invalid depth pixels. The areas of the test image that correspond to the areas of invalid depth pixels may have low intensity pixels that do not change by a threshold amount in the same areas of the control image. As both of these categories affect only the background and not the imaged human target, they need not correspond to a particular environmental modification. However, the existence of the problem categories may be considered when processing the depth image. For example, the distant backgrounds and/or specular reflective surfaces may be subtracted from the depth image to simplify processing.

In some embodiments, the above described methods and processes may be tied to a computing system including one or more computers. In particular, the methods and processes described herein may be implemented as a computer application, computer service, computer API, computer library, and/or other computer program product.

Figure 6:
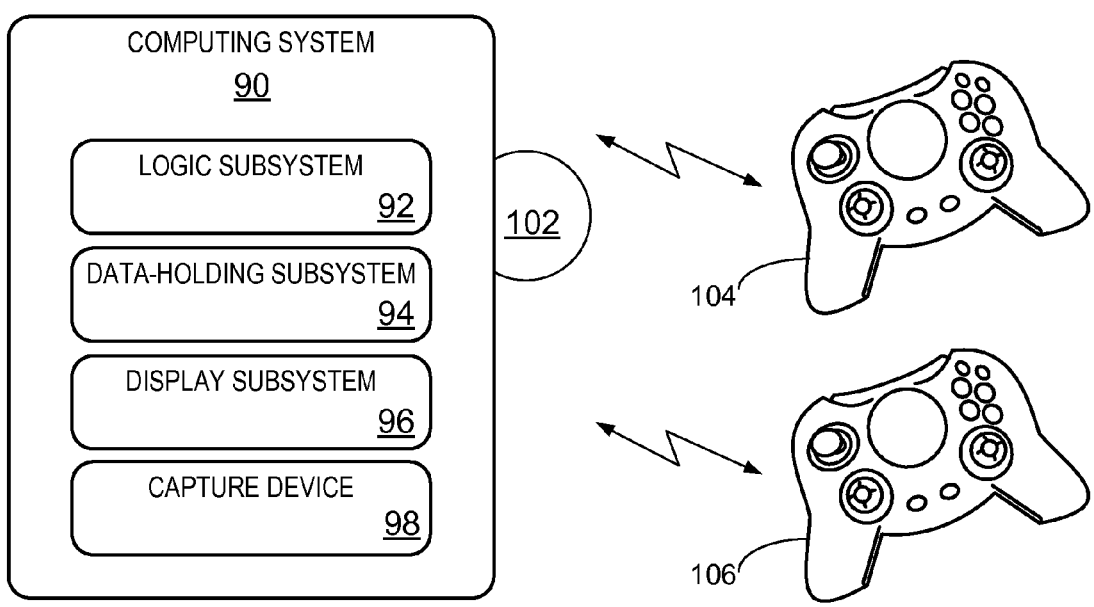
FIG. 6 schematically shows a computing system in accordance with an embodiment of the present disclosure.

FIG. 6 schematically shows a nonlimiting computing system 90 that may perform one or more of the above described methods and processes. Computing system 90 is shown in simplified form. It is to be understood that virtually any computer architecture may be used without departing from the scope of this disclosure. In different embodiments, computing system 90 may take the form of a mainframe computer, server computer, desktop computer, laptop computer, tablet computer, home entertainment computer, network computing device, mobile computing device, mobile communication device, gaming device, etc.

Computing system 90 includes a logic subsystem 92 and a data-holding subsystem 94. Computing system 90 may optionally include a display subsystem 96, capture device 98, and/or other components not shown in FIG. 6. Computing system 90 may also optionally include user input devices such as keyboards, mice, game controllers, cameras, microphones, and/or touch screens, for example.

Logic subsystem 92 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 94 may include one or more physical, non-transitory, devices configured to hold data and/or instructions executable by the logic subsystem to implement the herein described methods and processes. When such methods and processes are implemented, the state of data-holding subsystem 94 may be transformed (e.g., to hold different data).

Data-holding subsystem 94 may include removable media and/or built-in devices. Data-holding subsystem 94 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 94 may include devices with one or more of the following characteristics: volatile, nonvolatile, dynamic, static, read/write, read-only, random access, sequential access, location addressable, file addressable, and content addressable. In some embodiments, logic subsystem 92 and data-holding subsystem 94 may be integrated into one or more common devices, such as an application specific integrated circuit or a system on a chip.

FIG. 6 also shows an aspect of the data-holding subsystem in the form of removable computer-readable storage media 102, which may be used to store and/or transfer data and/or instructions executable to implement the herein described methods and processes. Removable computer-readable storage media 102 may take the form of CDs, DVDs, HD-DVDs, Blu-Ray Discs, EEPROMs, and/or floppy disks, among others.

It is to be appreciated that data-holding subsystem 94 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 96 may be used to present a visual representation of data held by data-holding subsystem 94 (e.g., a virtual avatar and/or a three-dimensional virtual world). As the herein described methods and processes change the data held by the data-holding subsystem, and thus transform the state of the data-holding subsystem, the state of display subsystem 96 may likewise be transformed to visually represent changes in the underlying data. For example, computing system 90 may be configured to render a driving game for display on a display device of display subsystem 96. As such, computing system 90 may include a display output to output the driving game interface to the display device. Display subsystem 96 may include one or more display devices utilizing virtually any type of technology. Such display devices may be combined with logic subsystem 92 and/or data-holding subsystem 94 in a shared enclosure, or such display devices may be peripheral display devices connected to the logic subsystem via a display output.

When included, a communication subsystem may be configured to communicatively couple computing system 90 with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 90 to send and/or receive messages to and/or from other devices via a network such as the Internet.

Computing system 90 further may include an integrated and/or peripheral capture device 98 configured to obtain depth-images of one or more targets. In either case, computing system 90 may include a peripheral input to receive depth images from a depth camera and deliver the received depth images to the logic subsystem for processing. Capture device 98 may be configured to capture video with depth information via any suitable technique (e.g., time-of-flight, structured light, stereo image, etc.). As such, capture device 98 may include a depth camera, a video camera, stereo cameras, and/or other suitable capture devices.

For example, in time-of-flight analysis, the capture device 98 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 98 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 98 may utilize other technologies to measure and/or calculate depth values. Additionally, capture device 98 may organize the calculated depth information into "Z layers," i.e., layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic. Computing system 90 may optionally include one or more input devices, such as controller 104 and controller 106. Input devices may be used to control operation of the computing system. In the context of a game, input devices, such as controller 104 and/or controller 106 can be used to control aspects of a game not controlled via the target recognition, tracking, and analysis methods and procedures described herein. In some embodiments, input devices such as controller 104 and/or controller 106 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding device holding instructions executable by a logic subsystem to:
   acquire a depth image from a depth camera;
   identify an environmental factor invalidating depth information in one or more portions of the depth image; and
   output an environmental modification to mitigate the environmental factor.

2. The data-holding device of claim 1, further holding instructions executable by the logic subsystem to model a human target imaged by the depth image with a virtual skeleton.

3. The data-holding device of claim 1, further holding instructions executable by the logic subsystem to assign one or more areas of the depth image including invalid depth information to a problem category from a plurality of predetermined problem categories.

4. The data-holding device of claim 3:
   wherein an area is assigned to the problem category because the area contains invalid depth pixels in a shape of a clothing item of a human target and a test image of the area while exposed to infrared test light does not change by a threshold amount compared to a control image of the area not exposed to the infrared test light; and
   wherein the environmental modification output to mitigate the environmental factor includes a recommendation to the human target to move closer to the depth camera.

5. The data-holding device of claim 3:
   wherein an area is assigned to the problem category because the area contains invalid depth pixels in a round shape surrounded by near-depth pixels and a test image of the area while exposed to infrared test light is high in intensity and the intensity reduces by a threshold amount in a control image of the area not exposed to the infrared test light; and
   wherein the environmental modification output to mitigate the environmental factor includes a recommendation to a human target to move away from the depth camera and/or reduce ambient light in a field of view of the depth camera.

6. The data-holding device of claim 3:
   wherein an area is assigned to the problem category because the depth image has a high noise level and a test image of a field of view around the area while exposed to infrared test light has a high intensity and does not change by a threshold amount compared to a control image of the field of view not exposed to the infrared test light; and
   wherein the environmental modification output to mitigate the environmental factor includes identification of a light source in the field of view and a recommendation to the human target to reduce light from the light source.

7. The data-holding device of claim 3:
   wherein an area is assigned to the problem category because the area contains invalid depth pixels in a specific and localized stripe across the depth image and a test image of the area while exposed to infrared test light contains saturated pixels and does not change by a threshold amount compared to a control image of the area not exposed to the infrared test light; and
   wherein the environmental modification output to mitigate the environmental factor includes a recommendation to the human target to reduce light in a field of view of the depth camera.

8. The data-holding device of claim 3:
   wherein an area is assigned to the problem category because the area contains invalid depth pixels in a round shape and a test image of the area while exposed to infrared test light contains saturated pixels in a round shape and does not change by a threshold amount compared to a control image of the area not exposed to the infrared test light; and
   wherein the environmental modification output to mitigate the environmental factor includes identification of a light source shining in a field of view of the depth camera and a recommendation to the human target to reduce light from the light source.

9. The data-holding device of claim 3:
wherein an area is assigned to the problem category because the area contains invalid depth pixels in small groups and a control image of a sample surrounding the area not exposed to infrared test light is reduced by a threshold amount compared to a test image of the sample exposed to the infrared test light; and
wherein the environmental modification output to mitigate the environmental factor includes a recommendation to a human target to move closer to the depth camera and/or reduce light in the field of view.

10. The data-holding device of claim 3, wherein the environmental modification is selected based on the problem category.

11. The data-holding device of claim 1, wherein the instructions are executable to output the environment modification by outputting a communication message for presentation to a human target, the communication message providing information on mitigating the environmental factor.

12. The data-holding device of claim 1, wherein the instructions are executable to output the environmental modification by outputting a control message for execution by an environmental modification system so that the environmental modification system alters an environment to mitigate the environmental factor without human intervention.

13. A method of depth imaging, comprising:
imaging a scene with a depth camera configured to measure a distance between the depth camera and surfaces in the scene;
in a test mode, acquiring from the depth camera a test image in which the scene is exposed with an infrared test light;
in a control mode, acquiring from the depth camera a control image in which the scene is not exposed with the infrared test light; and
outputting an environmental modification to mitigate an environmental factor identified by comparing the test image to the control image.

14. A method of depth imaging, comprising:
acquiring a depth image from a depth camera, the depth camera configured to measure a distance between the depth camera and surfaces in an imaged scene and configured to output the depth image as an indication of such measured distances;
modeling a human target imaged by the depth image with a virtual skeleton;
responsive to a failure to model the human target with the virtual skeleton, identifying a cluster of invalid depth pixels in the depth image;
acquiring a test image from the depth camera while the imaged scene is exposed with an infrared test light;
acquiring a control image from the depth camera while the imaged scene is not exposed with the infrared test light;
identifying an environmental factor responsible for the cluster of invalid depth pixels based on the cluster of invalid depth pixels, the test image, and the control image; and
outputting a communication message for presentation to the human target, the communication message providing information useable by the human target to mitigate the environmental factor.

15. The method of claim 14:
wherein the environmental factor responsible for the cluster of invalid depth pixels is identified by the cluster of invalid depth pixels having a shape of a clothing item of the human target and the test image having differences below a threshold amount compared to the control image; and
wherein the communication message to mitigate the environmental factor includes a recommendation to the human target to move closer to the depth camera.

16. The method of claim 14:
wherein the environmental factor responsible for the cluster of invalid depth pixels is identified by the cluster of invalid depth pixels having a round shape and being surrounded by near-depth pixels and the test image having high intensity pixels in a round shape that are reduced by a threshold amount in the control image; and
wherein the communication message to mitigate the environmental factor includes a recommendation to the human target to move away from the depth camera and/or reduce ambient light present in the imaged scene.

17. The method of claim 14:
wherein the environmental factor responsible for the cluster of invalid depth pixels is identified by the depth image having a high noise level and the test image having high intensity pixels in the imaged scene that are not reduced by a threshold amount in the control image; and
wherein the communication message to mitigate the environmental factor includes identification of a light source in the imaged scene and a recommendation to the human target to reduce light from the light source.

18. The method of claim 14:
wherein the environmental factor responsible for the cluster of invalid depth pixels is identified by the depth image having a specific and localized stripe of invalid depth pixels and the test image having high intensity pixels at the stripe that are not reduced by a threshold amount in the control image; and
wherein the communication message to mitigate the environmental factor includes a recommendation to the human target to reduce light in the imaged scene.

19. The method of claim 14:
wherein the environmental factor responsible for the cluster of invalid depth pixels is identified by the cluster of invalid depth pixels having a round shape and the test image having high intensity pixels in a round shape that are not reduced by a threshold amount in the control image; and
wherein the communication message to mitigate the environmental factor includes identification of a light source in the imaged scene and a recommendation to the human target to reduce light from the light source.

20. The method of claim 14:
wherein the environmental factor responsible for the cluster of invalid depth pixels is identified by groups of invalid depth pixels in the control image having a pixel intensity that is less than a pixel intensity of corresponding groups in the test image by a threshold amount; and
wherein the communication message to mitigate the environmental factor includes a recommendation to the human target to move closer to the depth camera and/or reduce ambient light present in the imaged scene.

* * * * *